Oct. 17, 1967 O. HALLA 3,348,184

HALL GENERATOR

Filed Oct. 24, 1965

United States Patent Office
3,348,184
Patented Oct. 17, 1967

3,348,184
HALL GENERATOR

Ottokar Halla, Nurnberg, Germany, assignor to Siemens-Schuckertwerke Aktiengesellschaft, Berlin and Erlangen, Germany, a corporation of Germany Filed Oct. 24, 1965, Ser. No. 504,504
Claims priority, application Germany, June 1, 1965, S 97,403
16 Claims. (Cl. 338—32)

ABSTRACT OF THE DISCLOSURE

A Hall plate of semiconductor material has four extending portions, each extending from a corresponding side of a central rectangle and each having an outer side having a determined length, an inner side coincident with the corresponding side of the central rectangle and parallel to and spaced from the outer side and a pair of spaced extending sides joining the outer and inner sides. The ratio of the length of the extending sides to the length of the outer sides has a value between 0.6 and 1.0 or a value at least equal to 1.2. Hall voltage electrodes extend along the entire length of two opposing outer sides and control current electrodes extend along the entire length of the other two opposing sides.

The present invention relates to a Hall generator. More particularly, the invention relates to a Hall generator having a linear Hall voltage versus control current characteristic at a substantially constant perpendicular magnetic field.

A curve is often plotted for a Hall generator with the abscissa representing the magnitude of the perpendicular magnetic field and with the ordinate representing the Hall voltage at a constant control voltage. Curves are plotted for various load or terminal resistances such as, for example, infinite resistance, 10 ohms and 5 ohms. In order to obtain a linear curve, a suitable terminal or load resistance must be determined and utilized. It is highly desirable to provide a Hall generator which has a linearity with the smallest possible tolerances at a given terminal or load resistance.

The principal object of the present invention is to provide a new and improved Hall generator.

An object of the present invention is to provide a Hall generator with a linear Hall voltage versus control current characteristic.

Another object of the present invention is to provide a Hall generator which is completely symmetrical.

Another object of the present invention is to provide a Hall generataor having electrodes extending along the entire length of the corresponding outer sides of the Hall plate.

Another object of the present invention is to provide a Hall generator having Hall voltage electrodes and control current electrodes which are interchangeable without damage to or destruction of the Hall generator.

Another object of the present invention is to provide a Hall generator having a small zero voltage.

Another object of the present invention is to provide a Hall generator having a high sensitivity, indicated by a steep slope of the Hall voltage versus control current characteristic.

In accordance with the present invention, the Hall generator comprises a Hall plate of semiconductor material having four extending portions, each of the extending portions extending from a corresponding side of a central rectangle and each having an outer side having a determined length, an inner side coincident with the corresponding side of the central rectangle and parallel to and spaced from the outer side and a pair of spaced extending sides joining the outer and inner sides. A Hall voltage electrode extends along the entire determined length of the outer side of a first of the extending portions. Another Hall electrode extends along the entire determined length of the outer side of a second extending portion opposite the first extending portion. A control current electrode extends along the entire determined length of the outer side of a third of the extending portions. Another control current electrode extends along the entire determined length of the outer side of a fourth extending portion opposite the third extending portion. The Hall generator of the present invention has a first pair of axes intersecting each other at right angles at the center of the central rectangle and a second pair of diagonal axes intersecting each other at right angles at the center of the central rectangle and positioned at 45 degrees with the first pair of axes. The Hall plate is symmetrical about each of the axes.

In order that the present invention may be readily carried into effect, it will now be described with reference to the accompanying drawing, wherein.

Figure 1:
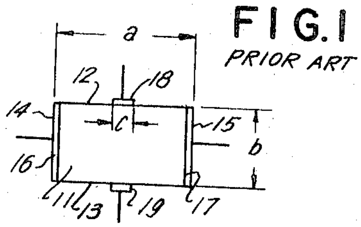
FIG. 1 PRIOR ART
FIG. 1 is a view of an embodiment of a known Hall generator.

In the known embodiment of a Hall generator of FIG. 1, the Hall plate 11 is a semiconductor plate of rectangular configuration having a pair of spaced, opposite, substantially parallel sides 12 and 13, and a second pair of spaced, opposite, substantially parallel sides 14 and 15 which are perpendicular to the first pair of sides 12 and 13. The length dimension $a$ of the first pair of sides 12 and 13 is longer than the length dimension $b$ of the second pair of sides 14 and 15.

A control current electrode 16 extends along the entire length $b$ of the side 14 and a control current electrode 17 extends along the entire length $b$ of the side 15. A Hall voltage electrode 18 extends along a small fraction $c$ of the length $a$ of the side 12 and a Hall voltage electrode 19 extends along a small fraction $c$ of the length $a$ of the side 13. The dimension $c$ is so small that it is substantially a point, so that the points of contact of the Hall voltage electrodes 18 and 19 have a strong effect on the zero voltage and on the linearity upon the slightest deviations of the dimension $c$. It is thus necessary in manufacturing a Hall generator of known type to utilize great precision in measuring the dimension $c$.

In a known Hall generator of the type of FIG. 1, the entire device may be destroyed if the control current electrodes 16 and 17 are mistaken for the Hall voltage electrodes 18 and 19. This is due to the great sensitivity of Hall generators. Furthermore, a zero voltage is produced in a known type of Hall generator. The zero voltage is the voltage which is produced at the Hall voltage electrodes 18 and 19 when a control current is supplied to the control current electrodes 16 and 17, but when the Hall device is not subjected to a perpendicular magnetic field. The elimination or reduction of the zero voltage requires a change in the geometry of the Hall plate.

Figure 2:
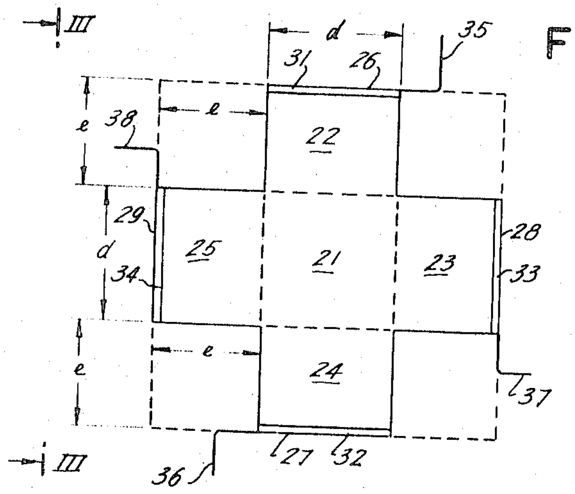
FIG. 2 is a view of an embodiment of a Hall generator of the present invention.
Figure 3:
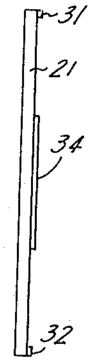
FIG. 3 is a view taken along the lines III—III of FIG. 2.

In the embodiment of FIGS. 2 and 3 of the present invention, the Hall plate 21 is of double symmetrical cross configuration. That is, the configuration of the Hall plate 21 is derived from an outer square comprising nine rectangles, formed by a first group of four parallel spaced lines intersected at right angles by a second group of four parallel spaced lines and with the four corner rectangles or squares removed. In other words, the Hall plate 21 comprises four extending portions 22, 23, 24 and 25, each of rectangular, and possibly square, configuration and each extending from a corresponding side of a central rectangle or square indicated by broken lines. Each extending portion thus comprises an outer side, an inner side parallel to and spaced from the outer side and coincident with the corresponding side of the central rectangle, and a pair of spaced parallel extending sides perpendicular to and joining the outer and inner sides.

The extending portions 22, 23 24 and 25 are not only symmetrical about an axis passing through the centers of the outer sides 26 and 27 of the device and about an axis perpendicular to the first-mentioned axis and extending through the centers of the outer sides 28 and 29 of the device and the center of the central rectangle or square, but are also symmetrical about diagonal axes perpendicular to each other and passing through the center of the central rectangle or square and positioned at 45° with each of the aforementioned axes. Thus, the device is completely symmetrical.

An electrode 31 extends along the outer side 26 for the entire length *d* thereof and an electrode 32 extends along the outer side 27 for the entire length *d* thereof. The electrodes 31 and 32 serve either as the control current electrodes or as the Hall voltage electrodes. An electrode 33 extends along the outer side 28 for the entire length *d* thereof and an electrode 34 extends along the outer side 29 for the entire length *d* thereof. The electrodes 33 and 34 may be utilized as the Hall voltage electrodes or as the control current electrodes. The interchangeability of the Hall voltage and control current electrodes is permissible due to the complete symmetry of the Hall plate 21. Since the electrodes are readily interchangeable and since each extends for the entire length of the corresponding outer side, the complete symmetry of the Hall generator protects it from damage or destruction regardless of whether the electrodes 31 and 32 are used as the Hall voltage electrodes or whether the electrodes 33 and 34 are so used.

In forming the embodiment of FIGS. 2 and 3 from a rectangle or square comprising nine rectangles, each removed corner square is bounded by an extending side of each of a pair of adjacent extending portions and has the same dimensions *e* by *e*. The Hall plate 21 comprises a plate of semiconductor material of known polycrystalline structure such as, for example, indium-arsenide, indium-antimonide or indium-arsenide-phosphide. The corner squares may be removed by any suitable means such as, for example, etching or sandblasting after the cross configuration is covered in the usual manner. The electrodes 31, 32, 33 and 34 are layers of solderable copper or silver or other suitable electrically conductive metal. The electrodes may be applied to their corresponding outer sides 26, 27, 28 and 29 by any suitable means such as, for example, galvanization. The electrically conductive leads for the electrodes may be affixed to the corresponding electrodes by any suitable means such as, for example, soldering or welding. The electrode leads 35, 36, 37 and 38 are affixed to the respective electrodes 31, 32, 33 and 34.

Figure 4:
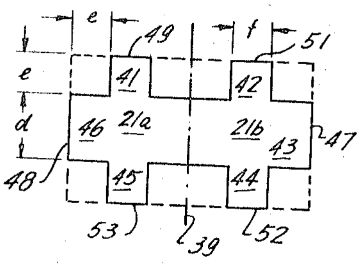
FIG. 4 is a view of a modification of the embodiment of FIG. 2.

FIG. 4 is a modification of the embodiment of FIG. 2 of the present invention. In the modification of FIG. 4, the Hall plate comprises two parts **21*a* and 21*b* each of which is substantially identical to the Hall plate of FIG. 2. The two parts 21*a* and 21*b* are joined to each other at an outer side of each, so that, although the entire device is still symmetrical about an axis through one of the pairs or outer sides and about an axis through the joinder line 39 of the parts 21*a* and 21*b***, the device is no longer symmetrical about the diagonal axes of the rectangle from which the modification of FIG. 4 is formed.

In the embodiment of FIG. 2, as hereinbefore mentioned, each of the extending portions 22, 23, 24 and 25 is of rectangular configuration and may be of square configuration. This also applies to the modification of FIG. 4. The modification of FIG. 4 comprises six extending portions 41, 42, 43, 44, 45 and 46. The remaining two extending portions, which would each have an outer side in the embodiment of FIG. 2, are joined to each other along the joinder line 39 to provide a central portion in the modification of FIG. 4. Since the extending portions are not square, the length *d* of the outer edges 47 and 48 of the extending portions 43 and 46, respectively, is longer than the length *f* of the outer sides 49, 51, 52 and 53 of the extending portions 41, 42, 44 and 45 respectively.

The removed corner squares still have the dimensions *e* by *e*, and the rectangle from which the modification of FIG. 4 is formed may be divided into eighteen rectangles from a single semiconductor plate. Alternatively, two Hall plates, each of the configuration of FIG. 2, may be separately formed and then joined at their outer sides, as shown. The modification of FIG. 4 has greater sensitivity and a steeper Hall voltage versus control current characteristic curve than known types of Hall generators at a determined control current and magnetic field.

Figure 5:
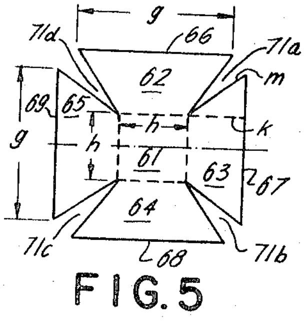
FIG. 5 is a view of another embodiment of the Hall generator of the present invention.

In the embodiment of FIG. 5, the Hall plate 61 of the present invention is of Maltese cross configuration. That is, the Hall plate 61 comprises four extending portions 62, 63, 64 and 65 each extending from a corresponding side of a central square which is defined by broken lines, and each having a trapezoidal configuration having a minor base coinciding with the central square and a major base spaced from and parallel to the minor base, the two bases being joined by spaced equilateral sides at equal angles with the major base and at equal angles with the minor base. The major base of each extending portion is the outer side thereof, the minor base of each extending portion is the inner side thereof, and the equilateral sides of each extending portion are the extending sides thereof. The extending portion 62 has an outer side 66, the extending portion 63 has an outer side 67, the extending portion 64 has an outer side 68 and the extending portion 65 has an outer side 69.

The Maltese cross configuration of FIG. 5 may be formed from a square semiconductor plate by removing an identical notch from each corner along the diagonal axes of the square. Each removed notch is symmetrical about its corresponding diagonal axis and is of triangular configuration with the apex of the triangle in contact with the corresponding corner of the central square shown by broken lines. The configuration of the embodiment of FIG. 5 is thus, as is the configuration of the embodiment of FIG. 2, completely symmetrical. The configuration of FIG. 5 is thus symmetrical about the axes through the centers of the outer sides 67 and 69, about the axes through the centers of the outer sides 66 and 68 and about each of the diagonal axes through the diagonally opposite corners of the central square. The electrodes, not shown in FIG. 5, extend along the outer sides 66, 67, 68 and 69 for their entire length *g*.

The notches formed to provide the configuration of the embodiment of FIG. 5 are indicated as **71*a*, 71*b*, 71*c* and 71*d*. The sensitivity and linearity characteristics of the embodiment of FIG. 5 are as good as those of FIGS. 2 and 4, although the cooling characteristic of the embodiment of FIG. 5 is better than the cooling characteristics of the embodiments of FIGS. 2 and 4, due to the area of the Hall plate of FIG. 5 being larger than those of FIGS. 2 or 4. The minor base or inner side of each extending portion 62, 63, 64 and 65** extends for a length *h*, which is the side dimension of the central square. The altitude of each of the extending portions has a length *k* and the lateral or extending sides of the extending portions are all equal in length and all extend for a length *m*.

Figure 6:
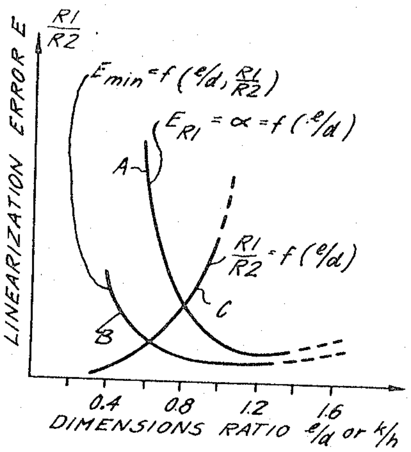
FIG. 6 is a graphical illustration of characteristics of the Hall generator of the present invention.

FIG. 6 is a graphical presentation of the error E of linearization versus the extending portion dimensions. In FIG. 6, the abscissa represents the ratio $e/d$ (FIGS. 2 and 4) or $k/h$ (FIG. 5) of the extending portions of the Hall generators as they correspond to the ratio $a/b$ of the known type of Hall plate, and the ordinate represents the linearization error E in percent and the ratio of the terminal or load resistance R1 to the internal resistance R2 of the Hall plate at a zero magnetic field.

Curve A of FIG. 6 indicates the linearization error E at a load or terminal resistance R1 of infinity versus the dimensions ratio $e/d$, for a constant control current and a variation in the magnetic field of, for example, zero to 10 kilogauss. Curve B of FIG. 6 indicates the minimum linearization error E min. at a terminal or load resistance R1 having an optimum value versus the dimensions ratio $e/d$. Curve C of FIG. 6 indicates the ratio $R1/R2$ versus the dimensions ratio $e/d$.

The curves A, B and C of FIG. 6 are provided for the embodiment of FIG. 2, and permit the determination of the dimensions ratio $e/d$, for a sperific terminal or load resistance R1, which provides the smallest linearization error E. The smallest linearization error E provides the best linearity of Hall voltage versus control current. The curves A, B and C are determined by measurement and may be verified without high tolerances due to the desirable characteristics of the Hall generator of the present invention. The curve A represents the function $E=f(e/d)$. The curve B represents the function $$E \text{ min.}=f(e/d, R1/R2)$$

The curve C represents the function $R1/R2=f(e/d)$.

FIG. 6 indicates that, for finite values of the terminal or load resistance R1, a maximum linearity, indicated by a minimum linearization error, is obtained at a dimensions ratio $e/d$ of 0.6 to 1.0. This is due to the fact that in this range of dimensions ratios, the curve B is at a minimum, substantially constant value of linearization error. FIG. 6 also indicates that, for an infinite value of terminal or load resistance R1, a maximum linearity, indicated by a minimum linearization error, is obtained at a dimensions ratio $e/d$ of 1.2 and greater. This is due to the fact that in this range of dimensions ratios, the curve A is at a minimum, substantially constant value of linearization error. As the magnitude of the dimensions ratio $e/d$ decreases, the minimum linearization error E min. increases and the required terminal or load resistance R1 decreases, as indicated by the curves B and C.

Figure 7:
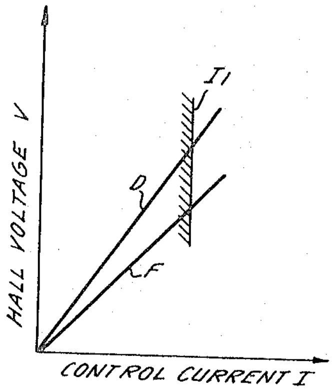
FIG. 7 is a graphical presentation of the voltage-current characteristics of the Hall generator of the present invention and of the known type of Hall generator.

FIG. 7 is a graphical presentation of the open circuit Hall voltage V versus the control current I at a constant magnetic field. In FIG. 7, the abscissa represents the control current I and the ordinate represents the Hall voltage V. Curve D of FIG. 7 indicates the open circuit Hall voltage versus the control current of the embodiment of FIG. 2 at a dimensions ratio $e/d$ of approximately 1.2. Curve F of FIG. 7 indicates the open circuit Hall voltage V versus the control current of the known embodiment of FIG. 1. In FIG. 7, the rated current region is indicated by I1. In the rated current region I1, the open circuit Hall voltage does not deviate from a linear value by more than one percent. The sensitivity of the Hall generator increases by 20%.

While the invention has been described by means of specific examples and in specific embodiments, I do not wish to be limited thereto, for obvious modifications will occur to those skilled in the art without departing from the spirit and scope of the invention.

I claim:

1. A Hall generator comprising
a Hall plate of semiconductor material having four extending portions, each of said extending portions extending from a corresponding side of a central rectangle and each having an outer side having a determined length, an inner side coincident with the corresponding side of the central rectangle and parallel to and spaced from the outer side and a pair of spaced extending sides joining the outer and inner sides, the ratio of the length of said extending sides to the length of said outer sides having a value between 0.6 and 1.0;
a Hall voltage electrode extending along the entire determined length of the outer side of a first of said extending portions;
another Hall voltage electrode extending along the entire determined length of the outer side of a second extending portion opposite said first extending portion;
a control current electrode extending along the entire determined length of the outer side of a third of said extending portions; and
another control current electrode extending along the entire determined length of the outer side of a fourth extending portion opposite said third extending portion.

2. A Hall generator as claimed in claim 1, wherein said central rectangle is a square.

3. A Hall generator as claimed in claim 1, wherein said central rectangle is a square and each of said extending portions is of square configuration.

4. A Hall generator as claimed in claim 1, wherein each of said extending portions is of rectangular configuration.

5. A Hall generator as claimed in claim 1, wherein the outer side of each of said extending portions has the same determined length.

6. A Hall generator comprising
a Hall plate of semiconductor material having four extending portions, each of said extending portions extending from a corresponding side of a central rectangle and each having an outer side having a determined length, an inner side coincident with the corresponding side of the central rectangle and parallel to and spaced from the outer side and a pair of spaced extending sides joining the outer and inner sides, the ratio of the length of said extending sides to the length of said outer sides having a value at least equal to 1.2;
a Hall voltage electrode extending along the entire determined length of the outer side of a first of said extending portions;
another Hall voltage electrode extending along the entire determined length of the outer side of a second extending portion opposite said first extending portion;
a control current electrode extending along the entire determined length of the outer side of a third of said extending portions; and
another control current electrode extending along the entire determined length of the outer side of a fourth extending portion opposite said third extending portion.

7. A Hall generator as claimed in claim 6, wherein said central rectangle is a square and each of said extending portions is of rectangular configuration.

8. A Hall generator as claimed in claim 7, wherein the outer side of each of said extending portions has the same determined length.

9. A Hall generator as claimed in claim 8, wherein the extending sides of each of said extending portions have the same length.

10. A Hall generator as claimed in claim 7, wherein said Hall plate has a first pair of axes intersecting each other at right angles at the center of the central square and a second pair of diagonal axes intersecting each other at right angles at the center of the central square and positioned at 45° with the first pair of axes, said Hall plate being symmetrical about each of said axes.

11. A Hall generator comprising
a Hall plate of semiconductor material having four extending portions of trapezoidal configuration, each of said extending portions extending from a corresponding side of a central square and each having an outer side having a determined length, an inner side coincident with the corresponding side of the central rectangle and parallel to and spaced from the outer side and a pair of spaced extending sides joining the outer and inner sides, the ratio of the altitude of each of said extending portions to the length of each of said inner sides having a value between 0.6 and 1.0;

a Hall voltage electrode extending along the entire determined length of the outer side of a first of said extending portions;

another Hall voltage electrode extending along the entire determined length of the outer side of a second extending portion opposite said first extending portion;

a control current electrode extending along the entire determined length of the outer side of a third of said extending portions; and another control current electrode extending along the entire determined length of the outer side of a fourth extending portion opposite said third extending portion.

12. A Hall generator as claimed in claim 11, wherein the outer side of each of said extending portions has the same determined length.

13. A Hall generator as claimed in claim 12, wherein the inner side of each of said extending portions has the same determined length, the length of the outer sides being greater than the length of the inner sides, and the extending sides of each of said extending portions have the same length.

14. A Hall generator as claimed in claim 13, wherein the extending sides of each of said extending portions are at the same angle with the outer side of each of said extending portions and at the same angle with the inner side of each of said extending portions.

15. A Hall generator comprising a Hall plate of semiconductor material having four extending portions of trapezoidal configuration, each of said extending portions extending from a corresponding side of a central square and each having an outer side having a determined length, an inner side coincident with the corresponding side of the central rectangle and parallel to and spaced from the outer side and a pair of spaced extending sides joining the outer and inner sides, the ratio of the altitude of each of said extending portions to the length of each of said inner sides having a value at least equal to 1.2;

a Hall voltage electrode extending along the entire determined length of the outer side of a first of said extending portions;

another Hall voltage electrode extending along the entire determined length of the outer side of a second extending portion opposite said first extending portion;

a control current electrode extending along the entire determined length of the outer side of a third of said extending portions; and another control current electrode extending along the entire determined length of the outer side of a fourth extending portion opposite said third extending portion.

16. A Hall generator as claimed in claim 15, wherein said Hall plate has a first pair of axes intersecting each other at right angles at the center of the central square and a second pair of diagonal axes intersecting each other at right angles at the center of the central square and positioned at 45° with the first pair of axes, said Hall plate being symmetrical about each of said axes.

References Cited

UNITED STATES PATENTS

| | | | |
|---|---|---|---|
| 2,914,728 | 11/1959 | Brophy et al. | 338—32 |
| 2,995,702 | 8/1961 | Lyon | 338—32 |
| 3,046,458 | 7/1962 | Basiago et al. | 338—32 |
| 3,162,932 | 12/1964 | Wood et al. | 338—32 |
| 3,189,762 | 6/1965 | Galpin | 338—32 |
| 3,202,913 | 8/1965 | Marinace | 338—32 |
| 3,239,786 | 3/1966 | Shang | 338—32 |

OTHER REFERENCES

"Electronics," June 16, 1961, "Miniature Hall Probe Maps Magnetic Fields," by D. D. Roshon, pp. 68, 70, 71, 324/45.

RICHARD M. WOOD, *Primary Examiner.*

W. D. BROOKS, *Assistant Examiner.*